United States Patent
Wells (10) Patent No.: US 12,039,810 B2
(45) Date of Patent: Jul. 16, 2024

(54) MULTI-PURPOSE TRUNCATED PYRAMIDAL CONE

(71) Applicant: John Andrew Wells, Phoenix, AZ (US)

(72) Inventor: John Andrew Wells, Phoenix, AZ (US)

(*) Notice: Subject to any disclaimer, the term of this patent is extended or adjusted under 35 U.S.C. 154(b) by 333 days.

(21) Appl. No.: 17/300,954

(22) Filed: Dec. 27, 2021

(65) Prior Publication Data
US 2023/0206701 A1    Jun. 29, 2023

(51) Int. Cl.
*G07C 1/24*      (2006.01)
*A63K 3/04*      (2006.01)

(52) U.S. Cl.
CPC . *G07C 1/24* (2013.01); *A63K 3/04* (2013.01)

(58) Field of Classification Search
None
See application file for complete search history.

(56) References Cited

U.S. PATENT DOCUMENTS

| | | | |
|---|---|---|---|
| 9,883,332 B2* | 1/2018 | Hansen | G16H 40/63 |
| 10,140,779 B2 | 11/2018 | Kolen et al. | |
| 10,417,932 B2 | 7/2019 | Wells | |
| 10,489,655 B2* | 11/2019 | Martin | G06F 16/5846 |
| 10,991,168 B2* | 4/2021 | Martin | G07C 1/24 |
| 11,462,017 B2* | 10/2022 | Martin | G06V 40/172 |

* cited by examiner

*Primary Examiner* — Ronald Laneau

(57) ABSTRACT

A multi-purpose truncated triangular pyramidal shaped cone is used as a sports field marker having a multi-sided shape with sides sloping at approximately 102.5° upward for the support of a smartphone with camera(s) leaning against a side to provide a stable view and record a timed finish of an athlete crossing a finish line of a race. The smartphone is secured to a side of the cone by an intermediate clamp holder having tapered resilient plugs pressed into receiving holes in the cone side. In an alternate use, plural cones are used to hold ends of a horizontal hurdle bar. This bar is raised higher by stacking identical hollow cones forming a stack with a long pole extending through a hole in a flat top surface of a top truncated cone. The pole is secured along a vertical axis of the cone stack by set screws converging along their axes from holes on each side of the pyramidal cone. A bowed cradle is mounted atop the pole to hold the horizontal hurdle bar.

20 Claims, 8 Drawing Sheets

MULTI-PURPOSE TRUNCATED PYRAMIDAL CONE

FIELD OF THE INVENTION

The present invention discloses cones used as markers in sports drills. Each cone has a three or four sided pyramidal shape for supporting and stabilizing a smartphone to record photo or video of an athlete by optimum positioning of a camera(s) lenses near ground level. The smartphone may also be paired with an IMU sensor, such as a MEMS sensor, worn by an athlete to gather biometric motion data in addition to the video or photos.

BACKGROUND OF THE INVENTION

Typically, as disclosed in U.S. Pat. No. 10,140,779B2, entitled "Camera-biometric Motion Timer and Method", issued 2018 Nov. 27 to Paul Kolen et al, a tripod is set up at a preselected finish line of a sports training drill, such as a sprint race, to stabilize and mount a smartphone loaded with a photo finish app used to capture the finish time as shown in FIG. 1 of that patent. The athlete is wearing a wrist mounted JAWKU™ 6-degree of freedom mems sensor, having motion sensing algorithms which are activated by movement of the athlete to record the starting time. An example of the athlete wearing the mems sensor running a three-cone drill is disclosed in U.S. Pat. No. 10,417,932B, entitled "Biometric Data Gathering", issued 2019 Jul. 17 to John Andrew Wells et al. Both of these patents are incorporated in their entirety into the disclosure of the present invention. IMU stands for Inertial Measurement Unit and MEMS stands for Micro-Electric-Mechanical Systems.

BRIEF SUMMARY OF THE INVENTION

It is an object of the present invention to eliminate the above referenced tripod using a base of a multi-purpose cone to directly contact the bottom of the smartphone supported by the base in conjunction with a side of the smartphone resting (leaning) against a specifically selected 102.5° sloping marker side to obtain best camera lens angle of a photo finish time as the athlete crosses the finish line. The smartphone can be mounted selectively higher on the side of the cone by use of a removable ledge with the ledge secured as by hooks to holes(s) placed through a conical side. The ledge maybe placed on any side of the marker having such holes.

Optionally, ledges on one or more sides can be permanently stamped at various predetermined heights (not shown) into some of the predetermined sides of the cone. The athlete may select different sides and camera heights. This permits best use of light conditions for the camera lens.

A reusable synthetic "gecko" tape may be used to support removable ledges at desired heights on the marker sides without use of holes. Different width smartphones may also be held by movable grippers biased towards each other by a spring. A back side of a holder for the spring has a flexible plug(s) protruding from the back side for attachment and detachment into prepositioned holes in a side(s) of the cone. The cone may also be used in stacks of cones to build varying heights to support a hurdle bar resting on a shallow saddle. Each saddle is attached to a long pole having an end secured inside the stack to form a hurdle gate.

DETAILED DESCRIPTION OF THE INVENTION

Figure 1:
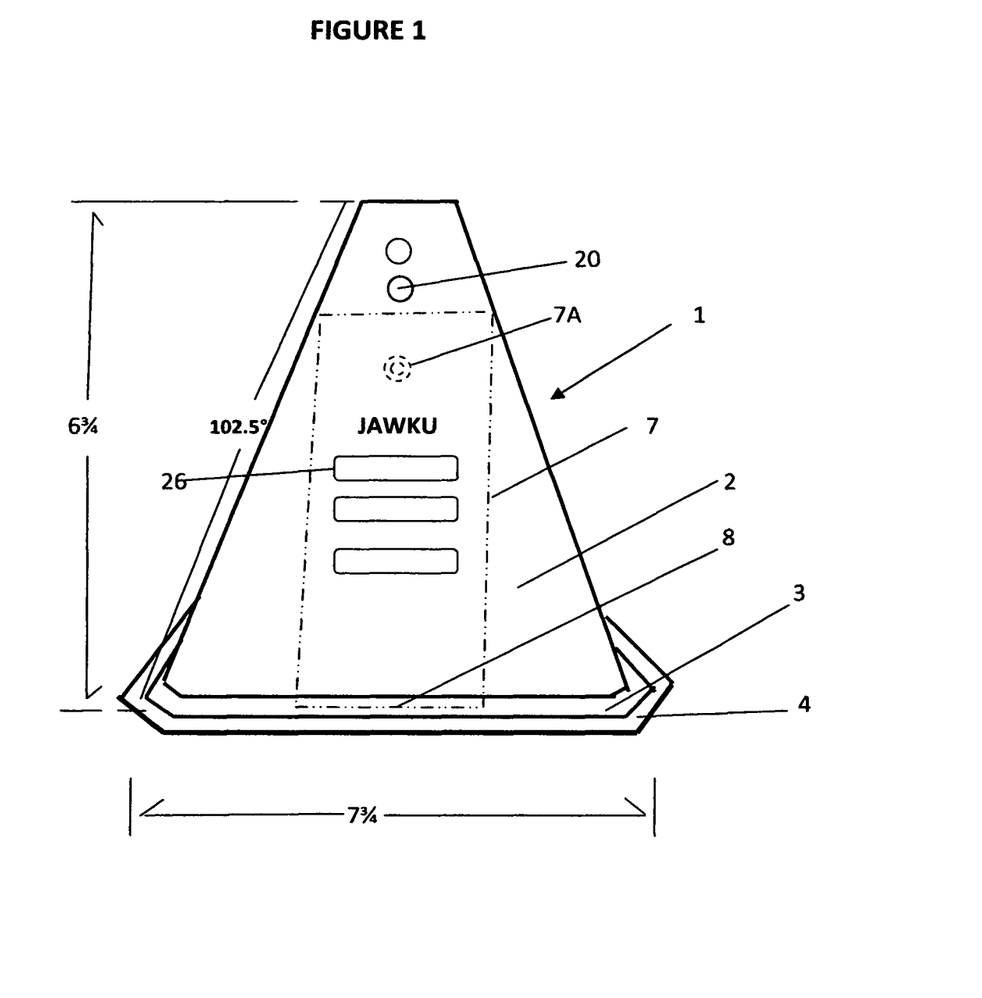
FIG. 1 is a perspective side view of the cone with a smartphone depicted in phantom in front of the sloping side of the cone.

Referring to FIG. 1, the cone 1 is a hollow truncated pyramidal cone having sides 2, 2a and 2b converging along a 102.5° slope. The cone 1 may have at least three sides. This angle is selected to ensure a preferred best camera lens angle for the smartphone's camera lens 7A (shown in phantom). This slope permits optimal aiming of the lens of the camera (s) to capture the photo finish time of an athlete executing a running drill or crossing a race finish line at which the cone has been prepositioned. A base 3 for the cone is flat and extends outwardly along the ground to peripherally surround the bottom of the sides of the cone. One or more sides may have a logo, such as JAWKU® or JAWKU SPEED®, displayed thereon to aid cone identification by pickup crews following drill workouts.

The base 3 is rimmed upward slightly by a lip 4 to aid in securing the smartphone on the cone between the lip and a side 2 against which it is located in a leaning position. The base 3 provides stability on the ground for the cone. The space between the lip 4 and the bottom edge of the sloping side is such as to allow the thickness of bottom edge 8 of the smartphone to snugly fit there between without slippage. This fit counters gusty winds and vibrations which can affect the stability of the smartphone leaning on the cone.

A base 3 of a small cone may be 7.75 inches in width per side between corners with the cone 6.75 inches tall to provide adequate ground stability of the cone and the smartphone. The above dimensions are not intended to be limitations as larger sizes may be utilized guided by the general ratio derivable from the above.

A row of holes 20 shown in FIG. 1 extends downward along the slope of the side 2 and are open to the hollow interior of the cone: Set screws or locking pins 30 (shown in FIG. 5) converge on the same plane and secure a pole passed through a central hole 11 in the truncated top 6. Below this row are parallel slots 26 into which a holder has a back with a tapered flexible plug inserted in one of the slots 26 with the holder having a front side supporting adjustable clamps 27, 27A (outlined in phantom in FIG. 2). A spring is used to adjustably bias the clamps towards each other to grip different sizes of smartphones. The plug has a conical tip with spaced tapered split sides forced to close upon entering a slot 26.

Figure 2:
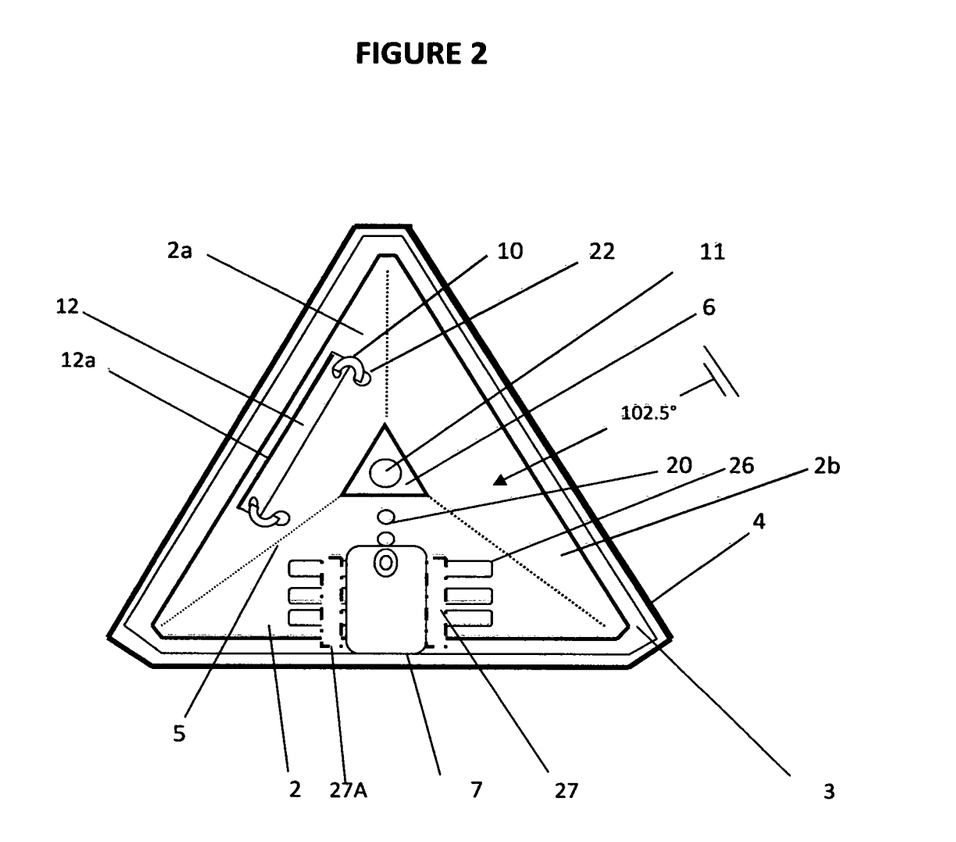
FIG. 2 is a top view of a three-sided cone.

FIG. 2 depicts a top view of cone 1 having a triangular top 6 with the cone's three sides 2, 2a and 2b sloping at a 102.5° angle to the base. A hole 11 is centered in the top 6 and provides an opening to the hollow interior of the cone 1. Smartphone 7 is held by the clamps 27, 27A mounted to side 2. The left hand side 2a of the cone has two holes 22 with upper ends of hooks 10 attached there through and lower hook ends engaging an add-on ledge 12 through small holes at each end of the ledge. The ledge can be adjusted vertically by use of smaller length hooks. The add-on ledge has a retaining lip 12a to prevent smartphone slippage.

Figure 3:
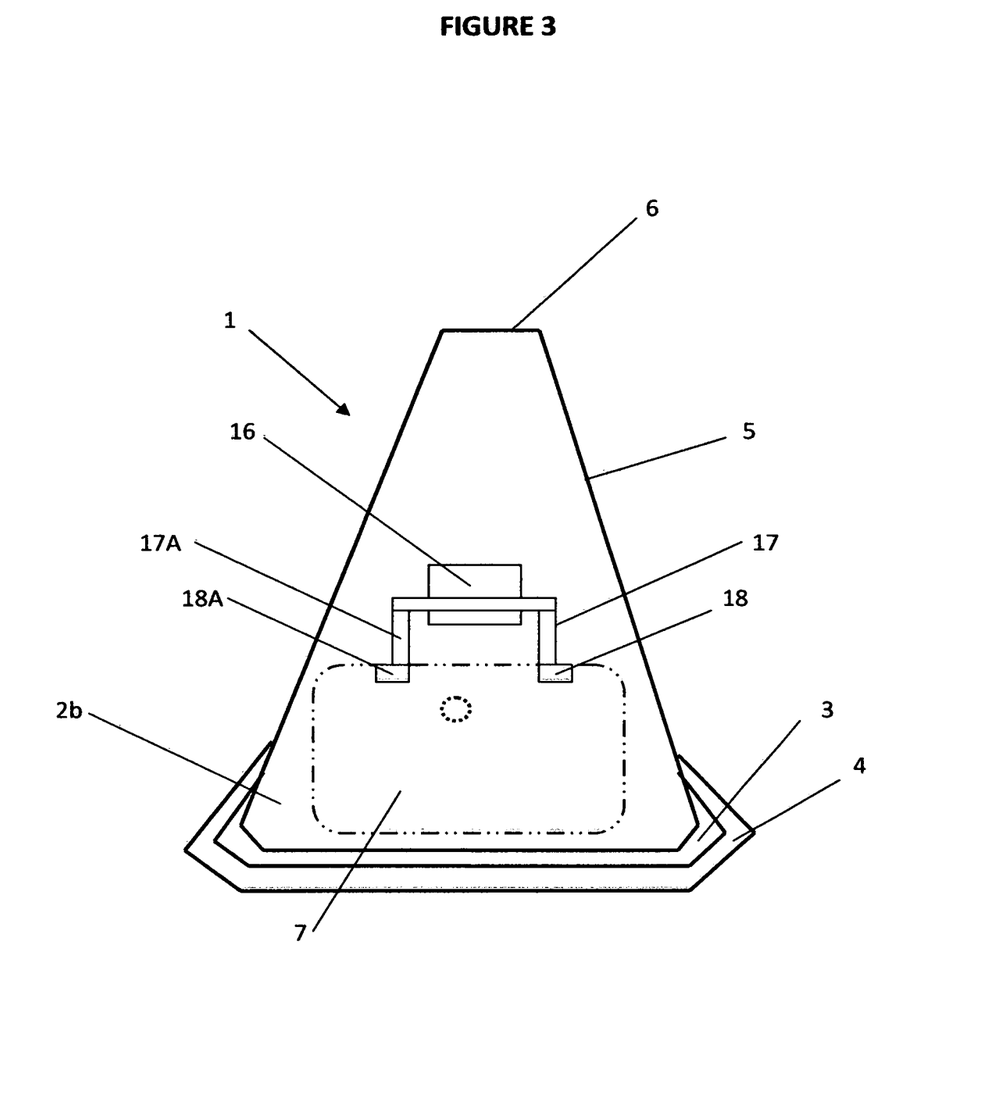
FIG. 3 is a view similar to FIG. 1 showing a removable gecko tape holding a smartphone by two gripper arms.

The right hand side 2b of the cone may be used to hang a ledge, like ledge 12, without the use of any holes in either the side 2b or the ledge by the use of double-sided gecko tape. As shown in FIG. 3, a small double sided strip of gecko tape 16 is pressed high on the side 2b with the front facing of the strip adhering to thin downwardly hanging arms 17, 17A. Clips 18, 18A are attached to the arms to pinch the upper perimeter of the smartphone outside of the screen or touch control areas. The gecko tape is used to temporarily secure the smartphone to a desired higher elevation on the sloped side 2b of the cone. This provides freedom for secure positioning of the smartphone higher than the base 3 of the FIG. 1 embodiment. Moderate wind or rain will not affect the gecko tape holding power for such application. The term "gecko tape" is commonly used in the adhesive art being derived from the feet of geckos' ability to stick to vertical or ceiling surfaces without use of adhesive. Gecko tape, also known as Geckskin®, has a synthetic surface emulating the gecko mammal feet having many tiny fibers relying for holding when pressed down on the forces of the Van der Wall principle. Although this surface is characterized technically as a non-sticking dry adhesive surface, it does not use a chemical adhesive and is easily removable without leaving any residue. It was featured in 2012 by CNN news as one of the top five innovations that year. The gecko tape is reusable multiple times and easily cleaned of dust and debris for immediate reuse.

As at least three sides constitutes the pyramidal cone, it is possible to set up a different smartphone on each side at different heights using the above disclosed three different holders, each of which is independently height adjustable.

Figure 5:
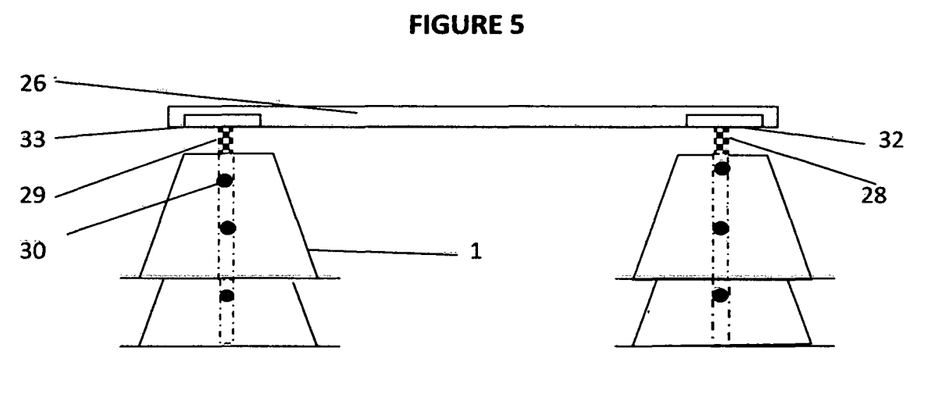
FIG. 5 is a front view of an embodiment of the hurdle gate of FIG. 4 with the hurdle bar resting above stacked cones.
Figure 6:
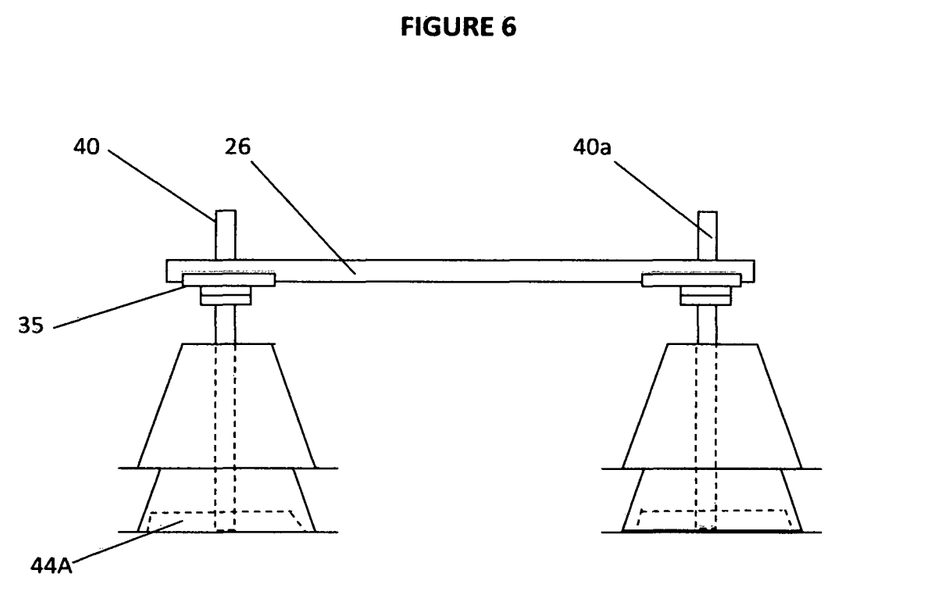
FIG. 6 is a front view of an embodiment of a hurdle gate with cradles in front of the stacks of cones.

As shown in FIGS. 5 and 6, plural cones support hurdle bar 26. Each cone is fourteen inches in height. By stacking several of the cones, which are hollow, an adjustable height may be selected to support hurdle bar 26 at various hurdle regulation heights. In one embodiment, cones have vertical rows of holes 20 (shown in FIG. 1) on each side to permit set screws or locking pins 30 (shown in FIG. 5) to engage pre-marked vertical lower portions of long poles 28, 29 whereby stack height is adjustable when the long poles are seated within the stacked cones through the holes 11 of each cone.

Figure 4:
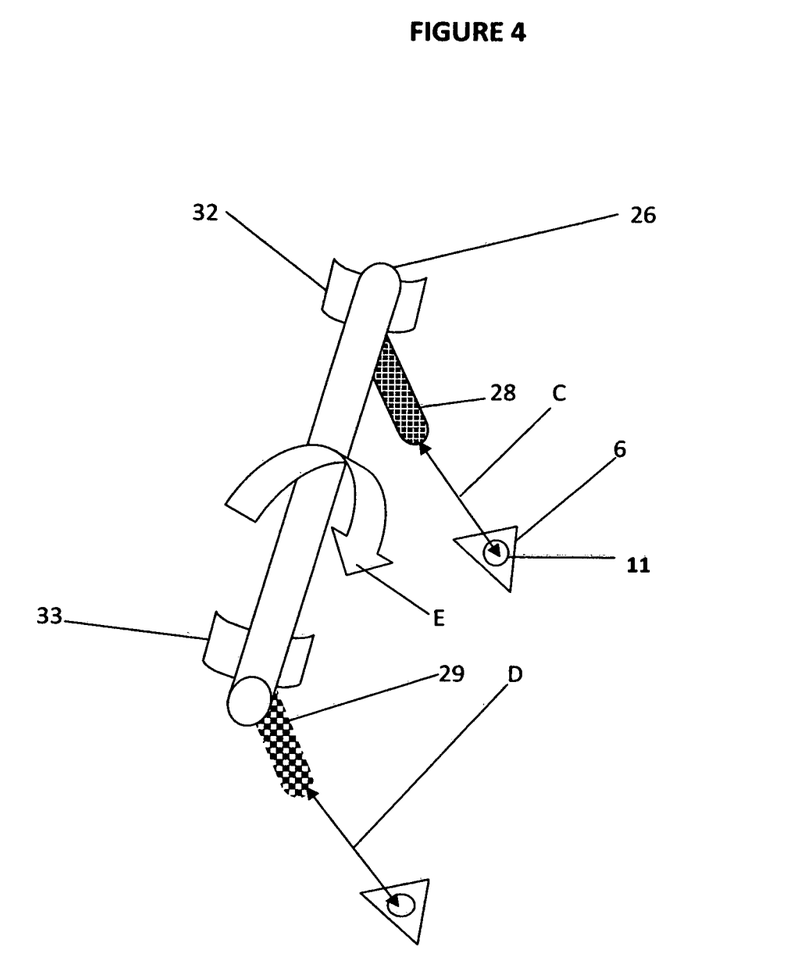
FIG. 4 is an overhead perspective view of a pair of cones forming a hurdle gate with a hurdle bar resting on cradles supported by poles located for insertion through a stack of cones.

In the embodiment shown in FIGS. 4 and 5 curved cradles 32, 33 are attached at the upper portion of long pole 28, 29. These cradles support the ends of a hurdle bar 26 sitting on top of the cradles which are curved or bowed as shown in FIG. 4 as a safety feature to allow the hurdle bar to lift and roll-off if the athlete's feet strike the hurdle bar.

The path of the jump is shown by reference arrow E in FIG. 4 with the direction of insertion of long poles 28, 29 through top holes 11 shown by double arrows C and D. Vertical adjustment of the hurdle bar 26 is also possible using telescoping poles for the poles 28, 29.

Figure 6A:
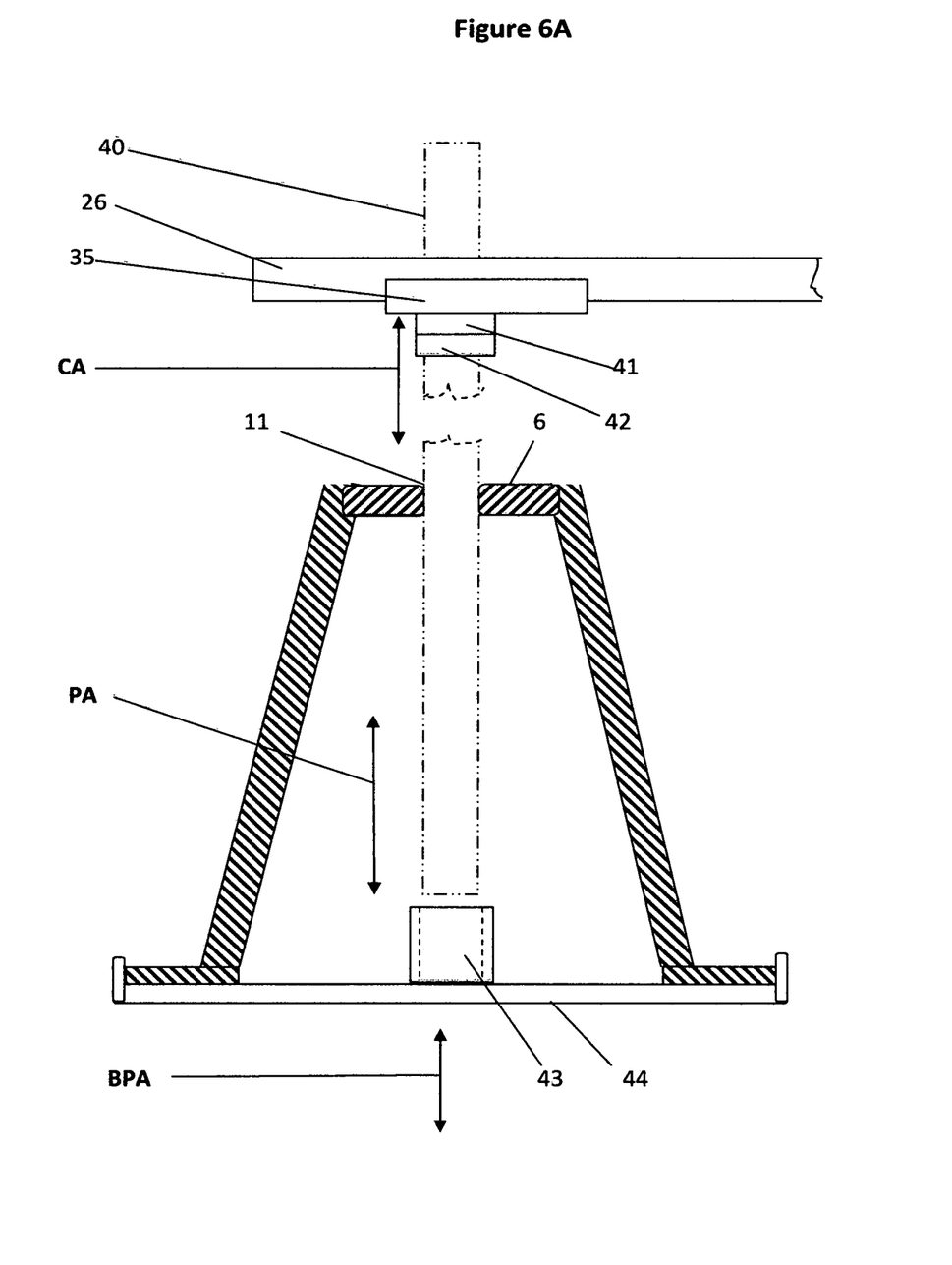
FIG. 6A is an enhanced sectional view of a bottom cone cap mounted outside the bottom of a hurdle gate cone.

A sectional view of a hollow cone with an exterior bottom support cap 44 covering the open ended bottom of the cone is depicted in FIG. 6A. The inside of the cover cap 44 has a raised collar 43 open upwardly to receive an end of a long pole 40 when inserted through the hole 11 of the cone top 6.

Figure 7:
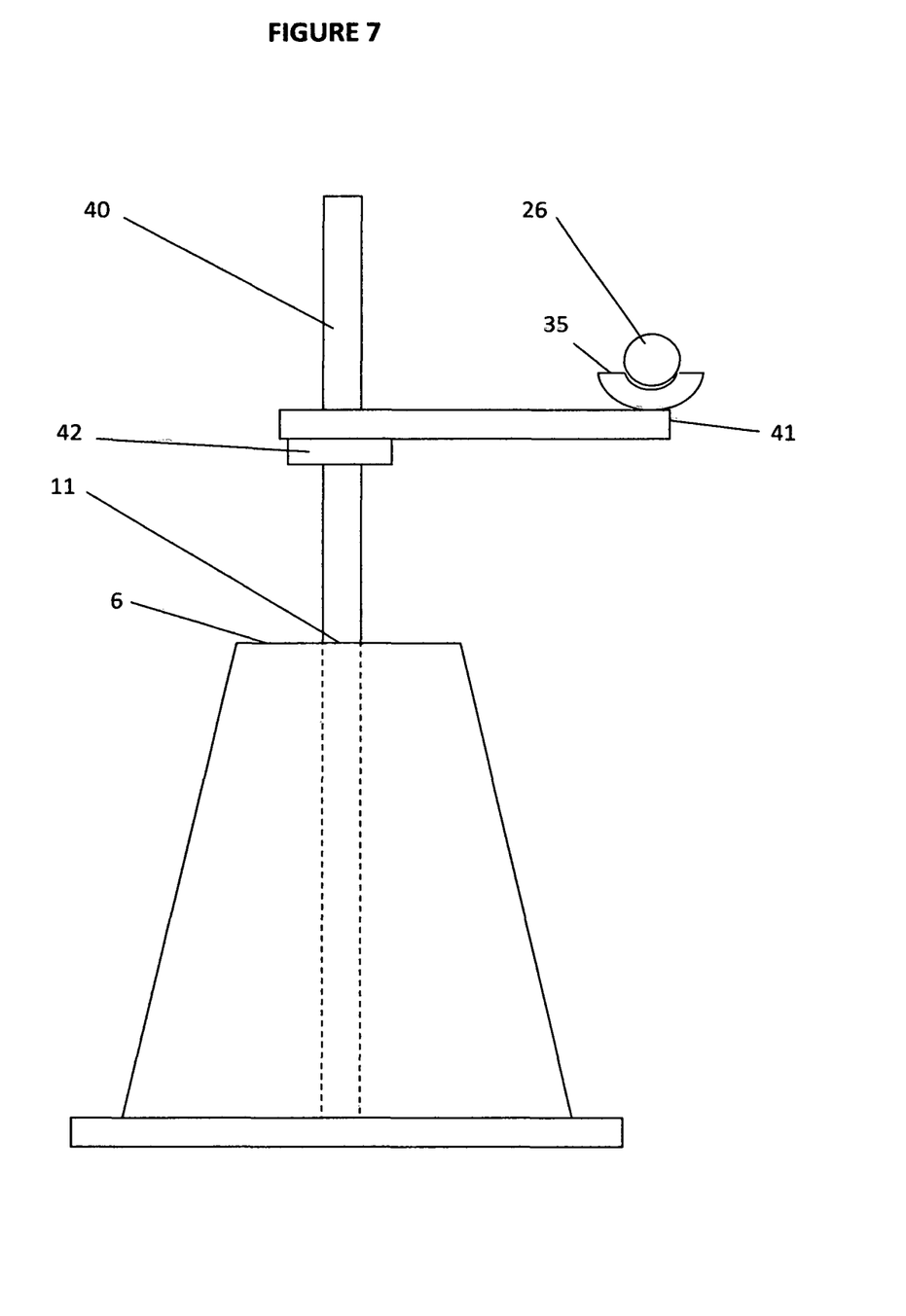
FIG. 7 is a side view of a hurdle gate cone of FIG. 6A showing a saddle supported by a pole to hold one end of a hurdle bar in front of the cone.

The bottom end of a pole 40 is thrust downward to engage/disengage the raised collar 43 in the directions shown in the figure by the double ended arrow PA. The combination of the top hole 11 and channel guide 43 stabilize the cradle 35. The cradle 35 is positioned in front of the cone or stacks of cones by an arm 41 attached to the cradle underside as best viewed in FIG. 7. A locking collar 42 abutting the underside of the arm is adjustable to allow the arm to move axially along the pole 40 for height adjustment of the cradle. The cover cap 44 has an outer perimeter which snap fits the cover around the rim of the cone.

Figure 6B:
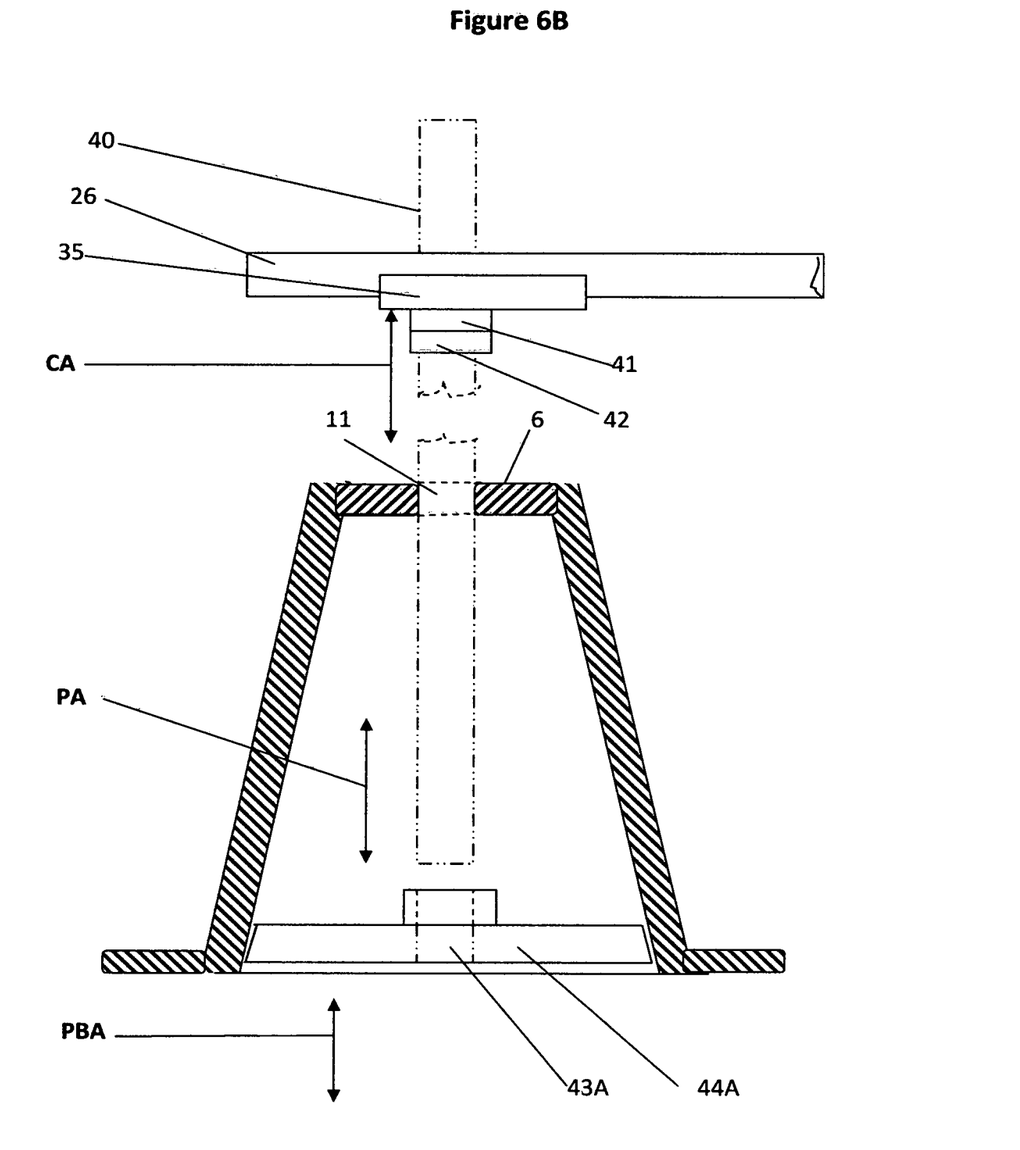
FIG. 6B is similar to FIG. 6A and shows another embodiment of a bottom cone cap inside the bottom of a hurdle gate cone.

Another variation of a cover cap is an inside cover cap 44A snugly fitted within the hollow bottom of the cone as shown in detail in FIG. 6B. A raised collar with an open channel 43A is centrally positioned and receives the end of the pole 40 when inserted fully downward through the top hole 11. The periphery of the inside cover cap 44A is sloped to match the inside slopes of the cone sides to allow a snug fit.

FIG. 6 shows the cover 44A used with the bottom cone to permit multiple stacking. Although not shown, either cone stack of the hurdle gate may use the outer snap cover embodiment of FIG. 6A.

SUMMARY

This invention is directed to a multi-use cone in the field of sports and is an inexpensive tripod capable of simultaneously mounting plural cameras facing different directions at different camera lens angles while at the same time serving as an integral part of a mounting system for hurdle gates. Other applications are possible, such as in military, in basic obstacle course training exercises. The poles 28, 29 may at their top mount various colored flags, lights, communication antennas, etc., useful for signaling and numbering positions of a course serving as expendable range finders when live ammunition is used.

What is claimed is:

1. A combination of a smartphone with at least one camera lenses and a cone placed on the ground for use by an athlete running a timed race wearing a wrist mounted mems sensor paired with the smartphone by Bluetooth® (BLE) protocol with the smartphone aligned to lean on the cone, the combination comprising:
   the cone having a pyramid shape having at least three sides, the at least three sides upwardly converging at a truncated top with the sides sloping at a 102.5° angle and the at least three sides diverging downwardly to a flat base of the cone; the cone having a hollow interior with an opening extending from a hole in the truncated top to the flat base; the combination further comprising an outer rim bordering the flat base having a slight curb sufficient to prevent slipping of the smartphone when leaned against one of the three sides; and
   the smartphone further held by a holder height adjustably attached to at least one of the three sides.

2. The combination of claim 1 wherein at least one of the three sides has rows of slots opening to the hollow interior;
   the holder having adjustable clamps for holding the smartphone;
   the holder having a back mounting at least one resilient plug having a tip for insertion and removal from the row of slots.

3. The combination of claim 2 further comprising the adjustable clamps are spring biased towards each other.

4. The combination of claim 2 wherein the tip of the at least one resilient plug is a tapered open-ended multi-sided tip.

5. The combination of claim 1 wherein the holder is a double sided "gecko" tape having a back side and a front side with the back side attached to the at least one of the three sides and the front side attached to thin extension arms having grippers for engaging a perimeter of the smartphone.

6. The combination of claim 5 wherein the grippers are spaced laterally apart to grip the perimeter of the smartphone.

7. The combination of claim 1 wherein the holder has an add-on ledge attached by a pair of hooks to at least one of the three sides through a pair of apertures placed through the at least one of the three sides.

8. The combination of claim 7 wherein the add-on ledge has a slightly raised outer retainer lip preventing slipping of the smartphone while placed on the add-on-ledge to lean against at least one of the three sides.

9. The combination of claim 7 wherein multiple pairs of apertures are spaced one above the other in at least one of the three sides to permit height adjustment of the add-on ledge.

10. A combination of a smartphone with at least one camera lenses and a cone placed on the ground for use by an athlete with the smartphone aligned to lean on the cone, the combination comprising:
   the cone having a pyramid shape having at least three sides, the at least three sides upwardly converging at a truncated top with the sides sloping at a 102.5° angle and the at least three sides upwardly converging at a truncated top with the side sloping at 102.5° and the at least three sides diverging downwardly from each other to a flat base of the cone, the cone having a hollow interior extending from a hole in the truncated top to the flat base; the flat base bordered by an outer upwardly projecting lip having a slight height sufficient to prevent slipping of the smartphone when leaned against at least one of the three sides; and at least one of the three sides having a holder for holding the smartphone above the flat base.

11. The combination of claim 10 wherein at least one of the three sides has rows of slots opening to the hollow interior;
   the holder having adjustable clamps for holding the smartphone; and
   the holder having a back mounting at least one resilient plug having a removable tip for insertion into one slot of the row of slots.

12. The combination of claim 11 further comprising the holder mounts adjustable spring biased clamps.

13. The combination of claim 11 wherein the tip has a conical end with spaced tapered open split sides.

14. The combination of claim 10 wherein the holder is a double sided "gecko" tape having a back side and a front side with the back side attached to the at least one of the three sides and the front side attached to thin extension arms having at least one gripper engaging a perimeter of the smartphone.

15. The combination of claim 14 wherein the smartphone has a top perimeter edge and the at least one gripper grips the smartphone along a top perimeter edge portion of the smartphone.

16. The combination of claim 10 wherein holder has an add-on ledge for the smartphone to sit on with the add-on ledge attached by a pair of hooks to at least one of the three sides through a pair of apertures in the at least one of the three sides.

17. The combination of claim 16 wherein multiple pairs of apertures are spaced one above the other in at least one of the three sides to permit height adjustment of the add-on ledge.

18. A combination of at least one hurdle gate comprising a horizontal hurdle bar having ends mounted by two spaced saddles with each spaced saddle separately supported by identical stacks of cones with each stack of cones mounting a pole extending vertically through at least one stack of cones, with each cone of the stack having a truncated pyramidal shape formed by at least three sides; each cone having a flat top with a hole through which the mounting pole extends; each cone in the stack having a hollow open interior ending in an outwardly extending base; the combination further comprising:
   at least one of a first removable bottom cap underneath the stack engaging the outwardly extending base or a second removable bottom cap surrounded by the base and fitting within a lowermost portion of the hollow open interior; with both the first cap and second cap having an upper surface mounting an open collar into which a lower end of the pole extends to secure a vertical alignment of the stack between the flat top of the highest cone of the stack and the bottom cap of the stack.

19. The combination of claim 18 wherein the two spaced saddles are independently vertically adjustable by support arms attached beneath the saddles and movable axially on each pole of the hurdle gate.

20. The combination of claim 19 wherein the support arms align the two saddles spaced in front of the stack of cones.

\* \* \* \* \*